United States Patent
Kubota et al.

(10) Patent No.: US 6,430,500 B1
(45) Date of Patent: Aug. 6, 2002

(54) DESTINATION INPUT DEVICE IN VEHICLE NAVIGATION SYSTEM

(75) Inventors: Tomoki Kubota; Koji Hori, both of Tokyo-to; Manabu Mazda, Chiba-ken; Kazuhide Adachi; Kouji Mukai, both of Tokyo-to, all of (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/478,355

(22) Filed: Jan. 6, 2000

(30) Foreign Application Priority Data

Jan. 11, 1999 (JP) .......................................... 11-004124

(51) Int. Cl.⁷ ............................................... G06F 3/14
(52) U.S. Cl. ........................ 701/209; 701/202; 701/201; 340/353; 340/995
(58) Field of Search ............................... 701/209, 211, 701/201, 202, 207; 340/995; 345/353

(56) References Cited

U.S. PATENT DOCUMENTS

| | | | | |
|---|---|---|---|---|
| 4,992,947 A | * | 2/1991 | Nimura et al. ............... | 701/201 |
| 5,519,392 A | * | 5/1996 | Oder et al. .................. | 340/995 |
| 5,784,059 A | * | 7/1998 | Morimoto et al. ........... | 345/353 |
| 6,049,755 A | * | 4/2000 | Lou et al. .................... | 701/207 |
| 6,064,322 A | * | 5/2000 | Ohira .......................... | 340/995 |
| 6,064,323 A | * | 5/2000 | Ishii et al. ................... | 340/995 |
| 6,067,502 A | * | 5/2000 | Hayashida et al. .......... | 701/209 |
| 6,088,649 A | * | 7/2000 | Kadaba et al. .............. | 701/201 |

FOREIGN PATENT DOCUMENTS

JP 895736 4/1996

* cited by examiner

*Primary Examiner*—William A. Cuchlinski, Jr.
*Assistant Examiner*—Tuan C To
(74) *Attorney, Agent, or Firm*—Lorusso & Loud (57) ABSTRACT

Disclosed is a destination input device for use in a vehicle navigation system that determines a drive route from a current position to a destination. The device includes a CD-ROM disc storing a plurality of destinations which are categorized into several groups. The user inputs his or her own behavioral schedule or purpose of travel today through a microphone or a touch panel on a display. The display is controlled by a CPU to provide a group selection menu representing a predetermined combination of the groups, in accordance with the inputted user's behavioral schedule. The user selects a specific one of the groups appearing on the displayed group selection menu, so that the display is controlled to provide a destination input menu representing a plurality of destinations included in the selected group, so that the user may readily select and input a desired destination from among those appearing on the displayed destination input menu.

8 Claims, 7 Drawing Sheets

| | DATE(P1) | WITH FAMILY(P2) | AIMLESS(P3) | OTHERS(P4) |
|---|---|---|---|---|
| 1 | RESTAURANTS | AMUSEMENT PARKS | FAMOUS PLACES | .. |
| 2 | AMUSEMENT PARKS | ZOO | PARKS | .. |
| 3 | THEATERS | AQUARIUMS | CAR PARTS SHOPS | .. |
| 4 | SHOPPING | BOTANICAL GARDENS | LIBRARIES | .. |
| 5 | FAMOUS PLACES | FAMOUS PLACES | SHOPPING | .. |
| 6 | KARAOKE | SHOPPING | THEATERS | .. |
| 7 | OTHERS | OTHERS | OTHERS | .. |
| .. | .. | .. | .. | .. |
| .. | .. | .. | .. | .. |
| n | PARKING AREAS | PARKING AREAS | PARKING AREAS | .. |

FIG. 12

DESTINATION INPUT DEVICE IN VEHICLE NAVIGATION SYSTEM

TECHNICAL FIELD

The present invention relates to a vehicle navigation system that automatically determines a drive route from a current position of a vehicle to a designated destination or destinations, along which the driver may drive the vehicle without going astray. The present invention specifically relates to input of a destination by the driver or user in operation of the vehicle navigation system.

BACKGROUND OF THE ART

Japanese patent publication No. 8-95736 discloses a navigation system in which a number of destinations are classified into groups including, for example, golf courses, amusement parks, skiing grounds, restaurants, hotels, highway interchanges, etc. A display first provides a group select menu showing a list of the groups, from which the user may select one group which is believed to include a destination where he or she wants to go. In actual application, since the display size is not sufficiently large to represent all of the group names, the group select menu comprises a plurality of menu pictures. For example, only "GOLF COURSES" and "OTHERS" appear on a first menu picture. When the desired destination is one of the golf courses, this group is selected by a finger touch on a touch panel of the display or with another input device, so that the display is switched to provide a destination input menu showing a list of destinations classified in the selected group. In the above-described example, since the user has selected "GOLF COURSES" in the group input menu, a list of names of the golf courses will appear on the destination input menu of the display, whereby the user may choose any one of the golf courses via the input device such as a touch panel. Thus, the selected golf course is inputted as a destination.

When the destination to be designated is not a golf course, the user touches a column of "OTHERS" appearing on the first menu picture so that the display is changed to provide a second menu picture on which other group names such as "AMUSEMENT PARKS", "SKIING GROUNDS", etc. now appear. The second menu picture also includes a touch panel section shown as "NEXT", which is depressed to switch the display to a third menu picture on which still other group names should appear. The user repeats such picture renewal operation until a group into which the destination to be designated is classified appears on the display.

The above-described prior art system is of more help in the user's selection and input of the destination as compared with selection of a desired one from a number of uncategorized destinations stored in the memory. However, in accordance with the above-described prior art, each group of menu pictures of the group select menu has a fixed pattern in which several groups are arranged in a predetermined order and layout. The user may designate differently categorized destinations day by day and case by case. When the single navigation system mounted on a vehicle may be used by two or more users, they may have different behavioral patterns that tend to select destinations in different groups. In summary, the above-described prior art has a disadvantage that the input menu pattern is fixed and can not be changed according to the pattern of the user's behavior. Consequently, the user is often obliged to depress the touch panel section "NEXT" again and again to renew the displayed pictures until a menu picture indicating a group in which the user's desired destination is categorized appears.

SUMMARY OF THE INVENTION

Accordingly, it is a primary object of the present invention to provide a vehicle navigation system in which any destination that the user desires is easy to select and input.

Another object of the present invention is to provide a vehicle navigation system in which a display is controlled to change a display pattern in response to the user's behavior schedule which may vary day by day or case by case, thereby assisting the user's destination selection and input operation.

Still another object of the present invention is to simplify the user's operation for selection and input of a destination which, in turn, facilitates determination of a recommended drive route from the current position to the destination in a vehicle navigation system.

To achieve the above objects, in accordance with an aspect of the present invention, there is provided a destination input device in a vehicle navigation system that determines a drive route from a current position to a destination to be inputted by a user, comprising a first memory that stores a plurality of destinations which are categorized into several groups; first input means for inputting a behavioral schedule of the user; first display control means that controls a display to provide a group selection menu picture representing a predetermined combination of the groups, in accordance with the user's behavioral schedule input by said first input means; second input means for selecting a specific one of the groups appearing on said display; second display control means for controlling the display to provide a destination input menu picture representing a plurality of destinations included in the selected group; and third input means for selecting a desired destination from among those appearing on said display.

In the destination input device of the present invention, a number of destinations are, in advance, classified or categorized into a plurality of groups depending upon the user's behavioral schedule, which are stored in the memory. The display is first controlled to provide a group selection menu display on which a predetermined combination of the groups appears. A specific one of the group selection menu displays is determined in accordance with the user's behavioral schedule input through the first input means. Accordingly, a group selection menu picture first appearing on the display may vary day by day, case by case, and user by user, because the user's behavioral schedule is not always the same. In accordance with the prior art navigation system, the user is often obliged to repeat operation for picture renewal of the display, until a pertinent group is found on the display. In accordance with the present invention, however, the user may readily select a pertinent group, since a first menu picture of the display, which is controlled by the first display control means and determined in response to the user's behavioral schedule, will most likely include a pertinent group containing a destination that the user desires. When the user selects one of the groups on the first menu picture of the display through the second input means, the display is then controlled to provide a destination selection menu picture on which a plurality of destinations that are categorized in the selected group will now appear. Since the destination that the user desires will surely be included in a destination list of the destination selection menu picture, this may readily be selected by the third input means.

The destinations are stored in the memory as having been categorized into one of predetermined groups including, for example, "RESTAURANTS", "AMUSEMENT PARKS", "GOLF COURSES", etc.

In a preferred embodiment, there is provided a second memory storing a table in which a particular behavioral schedule correlates with a predetermined combination of the destination groups, which is referred to by the first display control means. The display may randomly represent a predetermined combination of the destination groups. Alternatively, the display may represent a predetermined combination of the destination groups in a predetermined order, in which case the table also indicates priority in representation of the destination groups. The priority is determined also depending upon the user's behavioral schedule. A predetermined combination of the destination groups may extend over several group selection menu pictures, which may appear on the display with a predetermined priority.

In determination of the destination groups that should first appear on the display, the first display control may consider user-related information such as user's age and sex, in addition to the user's behavioral schedule.

The display may be a CRT or a liquid crystal display. Any of the first to third input means may comprise a voice recognition device through which the user's voice is analyzed and converted into a corresponding data signal. The input means may also comprise a touch panel coupled with the display, or any other device. In an actual design, a single input means may be provided for executing the function of any pair or all of the first to third input means.

Several items are in advance defined as the user's behavioral schedule, which items may include, for example, "DATE", "WITH FAMILY", "AIMLESS", etc. These items are represented on the display and may be selected by the user through operation of the first input means. In a preferred embodiment, the first input means cooperates with voice output means that produces a question about the user's behavioral schedule. In this embodiment, the first input means preferably comprises a microphone through which the user's answer to the question is input and a voice recognition device that analyzes the inputted user's answer. In another preferred embodiment, the first input means comprises a touch panel on the display showing a list of predetermined items of the user's behavioral schedule, one of which may be selected by a finger touch with a corresponding column appearing on the display.

In accordance with a modified aspect of the present invention, the user's behavioral schedule is not input by the user. Accordingly, there is provided a destination input device in a vehicle navigation system that determines drive route from a current position to a destination to be inputted by a user, comprising a memory that stores a plurality of destinations which are categorized into several groups; inference means that infers a behavioral schedule of the user; first display control means for controlling the display to provide a group selection menu picture representing a predetermined combination of the groups in accordance with the user's behavioral schedule inferred by said inference means; first input means for selecting a specific one of the groups appearing on said display; second display control means that control said display to represent destinations included in the selected group; and second input means for selecting a desired destination from among those appearing on said display. Preferably, the inference means infers the user's behavioral schedule in accordance with one or more items of user-related, pre-stored data selected from a group consisting of user-related data including the user's age and sex, the user's tastes or favorites and present season, day and time. For example, when it is at around noon, the inference means infers that the user may wish to have a lunch, so that the display is controlled to provide the group selection menu picture that includes "RESTAURANTS" with a greater priority. In the winter season, the inference means may infer that the user might wish to go skiing, so that the group selection menu picture appearing on the display should include "SKIING GROUNDS". In this modification, since the user's behavioral schedule is inferred automatically, the user may be freed from input operations.

In accordance with still another aspect of the present invention, there is provided a destination input device in a vehicle navigation system that determines drive route from a current position to a destination to be input by a user, comprising first input means for inputting a behavioral schedule of the user a first memory that stores a table defining a correlation between a particular behavioral schedule and a predetermined combination of destination groups, each destination group including destinations that have been categorized thereinto; first display control means for controlling a display to provide a group selection menu picture representing a predetermined number of the destination groups that are stored in said table of said first memory as being correlated with the user's behavioral schedule inputted by said first input means; second input means for selecting a specific one of the groups appearing on said display; second display control means for controlling the display to provide a destination selection menu picture representing a plurality of destinations included in the selected group; and third input means for selecting a desired destination from among those appearing on the display.

In the present invention, the group selection menu picture appearing on the display represents a predetermined number of the destination groups because of the limited size of the display screen. Accordingly, each destination group is preferably assigned with a priority in representation on the display, in accordance with the input or inferred behavioral schedule of the user. Of course, the number of the destination groups that can be shown on the display screen may be changed and selected by the user's operation.

In a preferred embodiment, there is provided a second memory that stores past records of the user's behavioral schedule input by the first input means in combination with the destination group subsequently selected by the second input means. The table stored in the first memory may be renewed to update the user's behavior patterns, with reference to the past records stored in the second memory.

BRIEF DESCRIPTION OF DRAWINGS

The above and other objects of the present invention will become apparent from the following description when read in conjunction with the accompanying drawings in which.

DESCRIPTION OF EMBODIMENTS OF THE INVENTION

In a preferred embodiment, which will be hereinbelow described in reference to FIGS. 1–12 of the accompanying drawings, the present invention is designed to cooperate with a navigation system which is mounted on a vehicle and which determines a recommended drive route from a current vehicle position (or starting position) to a destination that is input by the user. The planned drive route is displayed on a display together with a road map of the vicinity. There is also provided a speaker through which a machine voice is output to assist the driver in driving the vehicle along the planned drive route.

Figure 1:
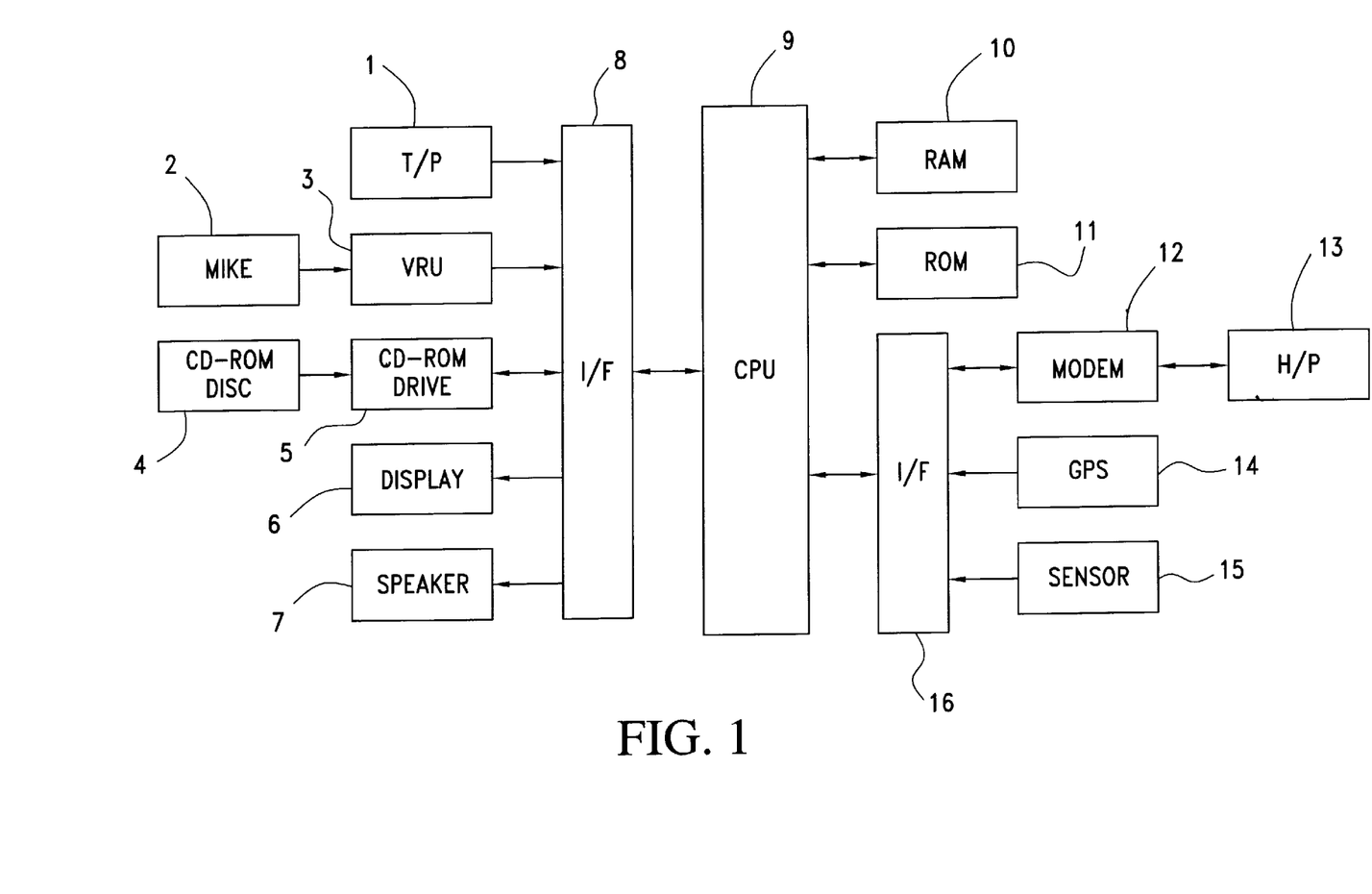
FIG. 1 is a block diagram showing a navigation system in which a destination input device in accordance with an embodiment of the present invention is incorporated.

FIG. 1 is a block diagram of a navigation system incorporating a destination input device embodying the present invention. The system includes a touch panel (T/P) 1, a microphone (MIKE) 2, a voice recognizing unit (VRU) 3, a CD-ROM disc 4, a CD-ROM disc drive 5, a display 6, a speaker 7, interfaces (1/F) 8 and 16, a central processing unit (CPU) 9, a RAM 10, a ROM 11, a modem 12, a cellular phone (H/F) 13, a global positioning system (GPS) receiver 14, and a sensor 15.

Touch panel 1 constitutes the input means of the destination input device of the present invention that is operated to designate a starting position and/or destination, to input the user's behavioral schedule, to select one of the destination groups in the destination group selection menu picture appearing on display 6, to select one of the destinations in the destination selection menu on display 6, etc. As known, touch panel 1 comprises a transparent sheet panel covering a screen 17 of display 6 (FIG. 2), and any item shown on display 6 may be selected by depressing a corresponding area of touch panel 1 above a rectangular frame surrounding the item to be selected.

Figure 2:
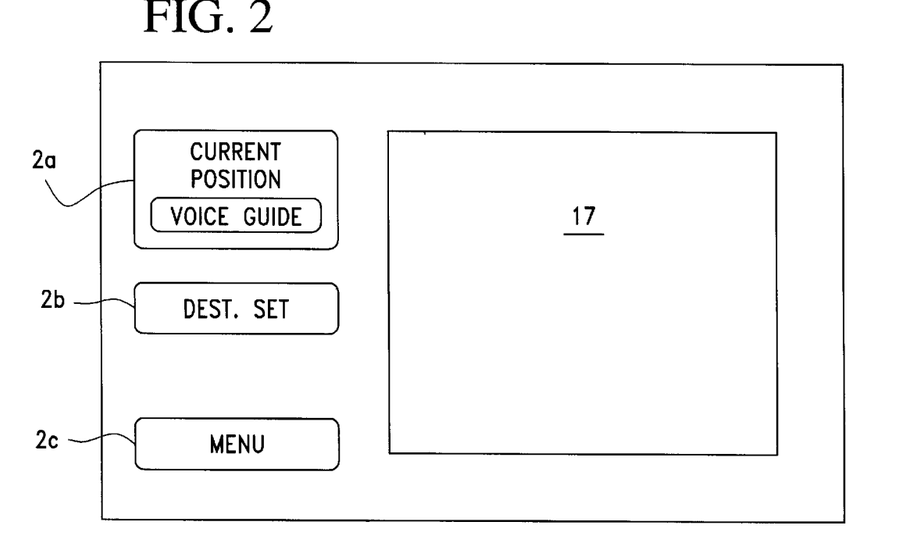
FIG. 2 is a view showing a display unit of the navigation system.

As shown in FIG. 2, a display unit includes a current position switch 2a that is depressed by the user's finger so that a current position of the vehicle is shown on display screen 17 together with a road map of the vicinity. A destination input switch 2b is depressed to initiate the destination input operation. A menu switch 2c is depressed to present a menu picture on display screen 17. These switches are arranged beside display screen 17.

Microphone 2 is used to input the user's voice, which is then processed and analyzed by voice recognizing unit 3. The user's voice includes an answer to the question that is output through speaker 7 in asking for the user's behavioral schedule, which will be described hereinlater in detail. CD-ROM disc 4 stores map data and destination data which is, in this invention, categorized into several groups. Data in CD-ROM disc 4 may be read out by CD-ROM disc drive 5. Speaker 7 is used to output the question, as stated above, and to output drive route guidance as in the prior art navigation system.

CPU 9 receives data via 1/F 6 to execute various data processing operations and controls. To CPU 9 is connected RAM 10 and ROM 11 through data bus lines. RAM 10 is a random-access-memory to be used as a working memory when CPU 9 performs a data processing operation. ROM 11 is a read-only-memory storing various data and programs necessary to perform operation in CPU 9. As is known, CPU 9 receives the current vehicle position data and the destination data which is input by the user through touch panel 1 or microphone 2, to determine a recommended drive route from the current position to the destination. In this invention, CPU 9 also operates to control display 6 so that an appropriate menu picture appears thereon for easier selection and input of the destination, which will be described hereinlater in detail. In this embodiment, CPU 9 also controls activity of a personified agent appearing on display 6 and/or produced through speaker 7, which will also be described hereinlater in detail. CPU 9 executes such an operation in accordance with programs stored in ROM 11.

Modem 12 and cellular phone 13 allow data transmission from an information center (not shown) to CPU 9 via 1/F 16. The vehicle current position data or any data for use in data processing or control operations by CPU 9 may be obtained from the information center.

GPS receiver 14 receives radio waves from earth satellites to determine absolute coordinates of the current vehicle position. GPS receiver 14 may cooperate with a beacon receiver (not shown) that receives positional information from beacons on the roads, to thereby increase accuracy in detection of the vehicle position. Sensors 15 may include a distance sensor, a speed meter, a direction sensor, a steering sensor, etc. which sensor outputs a detection signal for correction of the current vehicle position data obtained by GPS receiver 14 for more precise detection. The distance sensor detects a distance of movement by detecting revolution of the wheels or acceleration, for example. The direction sensor may include a terrestrial magnetism sensor that detects terrestrial magnetism to determine orientation of the vehicle, a gyromagnetic sensor that detects a rotational angle velocity of the vehicle that is integrated to determine orientation of the vehicle, and a pair of wheel sensors that detect an output pulse difference (a difference of movement between left and right wheels) to detect an angle of gyration of the vehicle. The steering angle sensor may employ an optical sensor or rotation resistance sensor mounted adjacent a rotating member of the steering mechanism to detect a steering angle.

CD-ROM disc 4 and disc drive 5 constitute the memory in the destination input device of the present invention. Data stored in CD-ROM disc 4 may include map data to be represented on display 17, crossing data identifying coordinates and name of each crossing, road data identifying each road by the crossings at the beginning and at the end, node data specifying coordinates of several points located on each road, and address data specifying coordinates and name of each point that may be designated as a destination. These data items are used in the route-finding operation by CPU 9.

Figure 11:
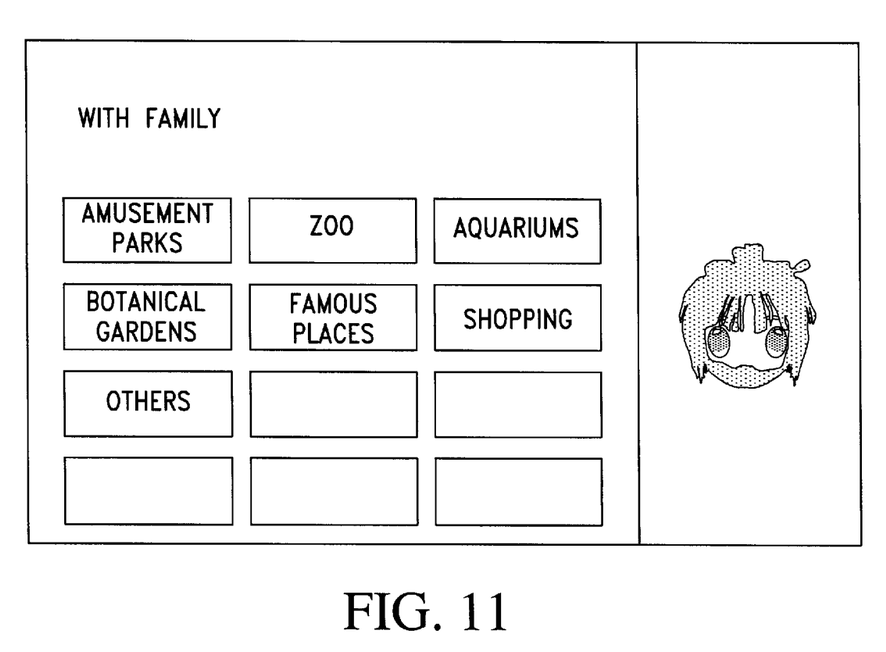
FIG. 11 is a view showing another example of a destination group selection menu appearing on the display when another behavioral pattern is selected by the user.
Figure 12:
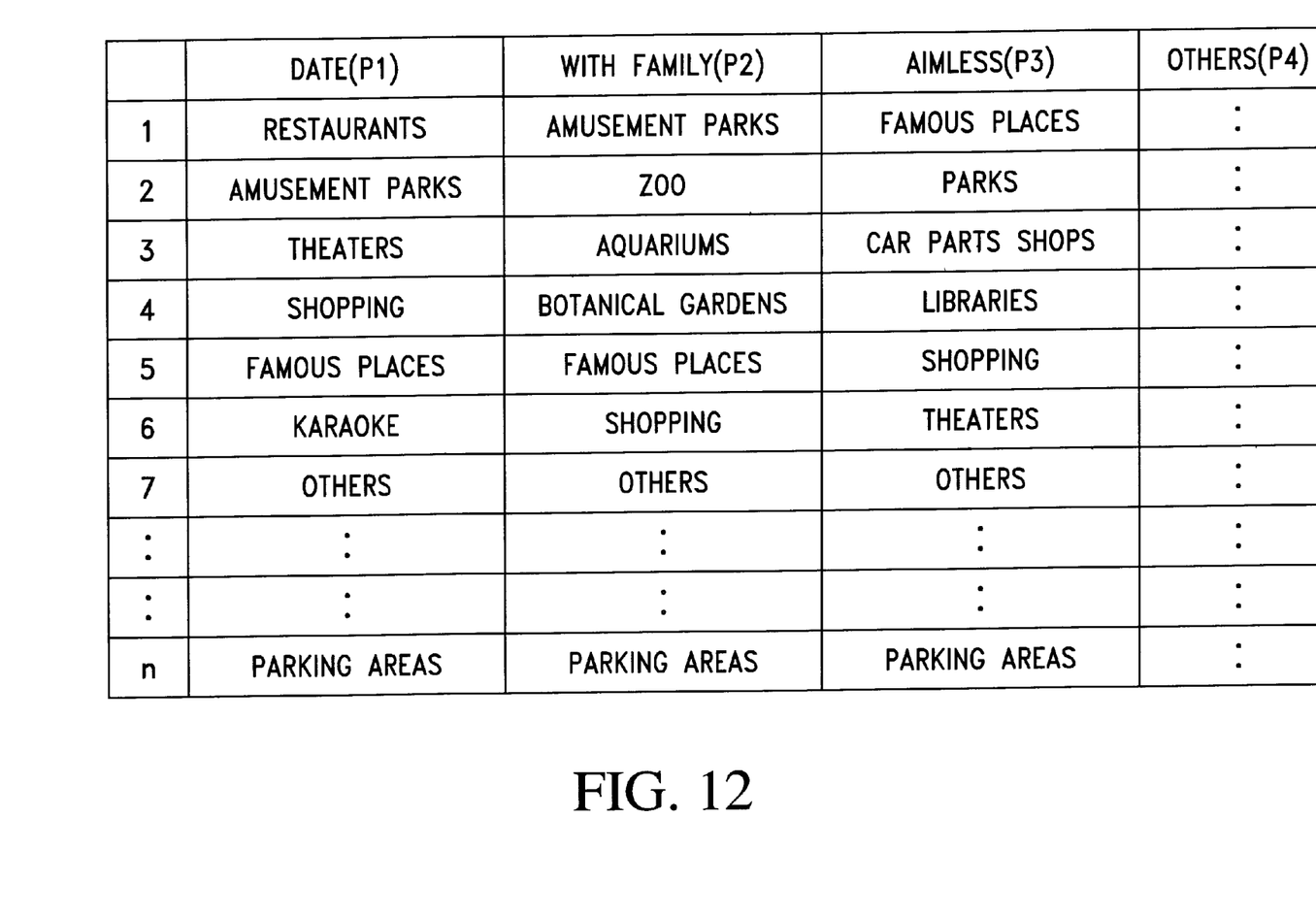
FIG. 12 shows an example of a table showing correlation between the user's behavioral schedules and the destination groups with priority in representation on the display.

CD-ROM disc 4 further stores a great number of destinations which have already been categorized into several destination groups such as "GOLF COURSES", "AMUSEMENT PARKS", "SKIING GROUNDS", etc. Specifically referring to FIG. 12, in this embodiment, CD-ROM disc 4 stores a table in which a specific set consisting of prioritized destination groups is stored in relation to a specific behavior schedule to be followed by the user. The user's behavioral schedule may be determined by the purpose of travel on that day. When the user gets into the vehicle to make a date with his or her lover, the user probably wishes to have a lunch or dinner at a restaurant, to go to an amusement park, to go to a theater, to go shopping, etc. A combination of these destination groups arranged in a predetermined order as determined with relation to a particular behavioral schedule that is referred to by "DATE", for example. Likewise, another combination of the prioritized destination groups is stored with relation to another behavioral schedule that may be referred to by "WITH FAMILY", "AIMLESS" or "OTHERS". The number in the lefthand column of the table in FIG. 12 indicates priority in representation on display 17. For example, when "DATE" is selected as the user's behavioral schedule and when display 17 is capable of representing four items at the same time, the group selection menu first appearing on display 17 includes the first four items ("RESTAURANTS", "AMUSEMENT PARKS", "THEATERS" and "SHOPS"), which is renewed by the user's operation to a second group selection menu that includes the next four items. In the examples shown in FIGS. 10 and 11, each group selection menu picture includes twelve items that are arranged from left to right and from top to bottom in accordance with the priority described in the table of FIG. 12. Of course, the table shown in FIG. 12 is only one example and may be designed and customized as required.

Figure 6:
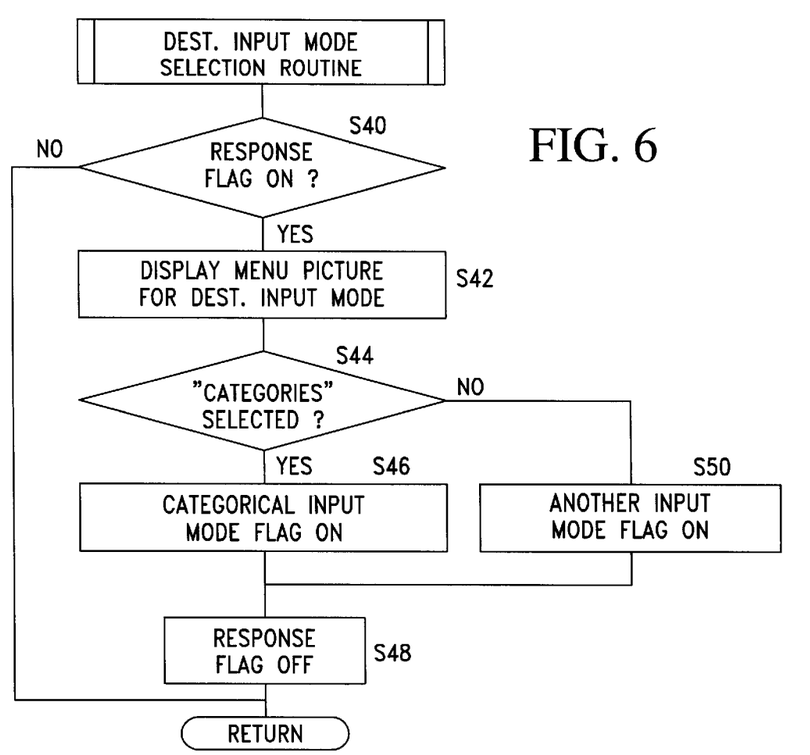
FIG. 6 is a flowchart of a destination input mode selection routine to be executed after a user's response is confirmed.
Figure 7:
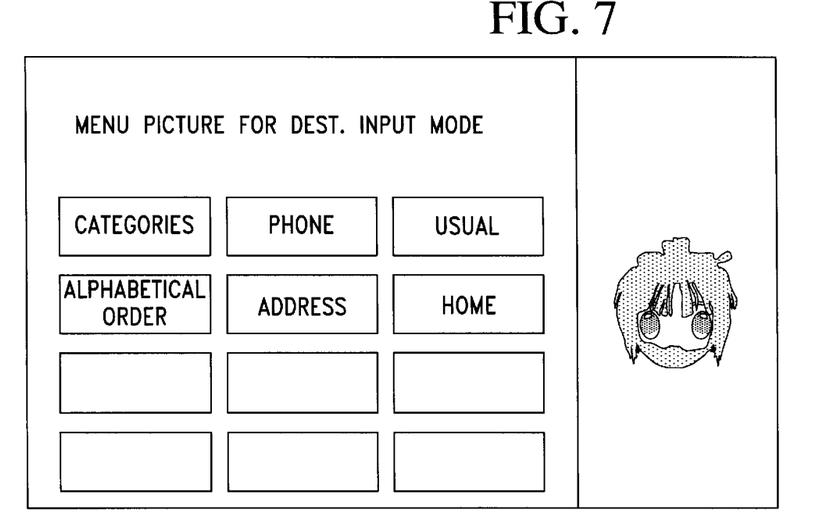
FIG. 7 is an example of a menu appearing on the display, which may be operated by the user to choose one of the destination input modes as desired.
Figure 8:
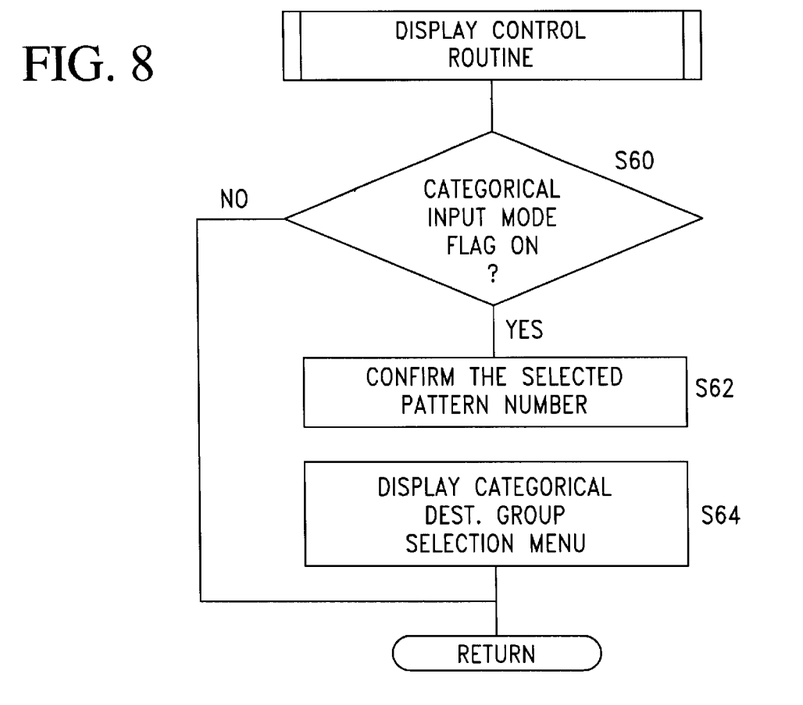
FIG. 8 is a flowchart of a display control routine to be executed when one of the input modes appearing on the display is selected by the user.
Figure 10:
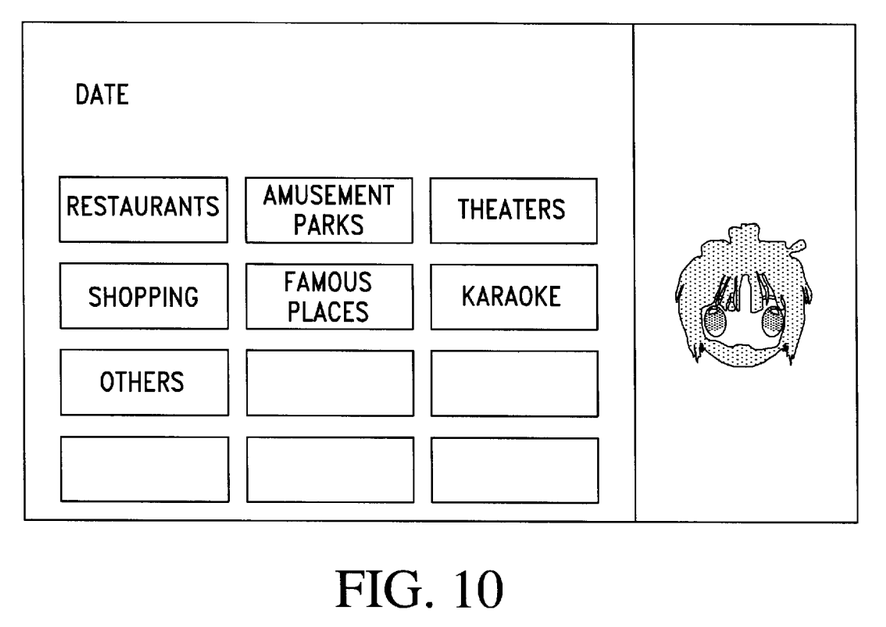
FIG. 10 is a view showing an example of a destination group selection menu picture appearing on the display when one of the behavioral patterns is selected by the user.

With the destination input device of this embodiment, the destination where the user wishes to go is selected and input in the following manner. Briefly, a machine voice question is output, in accordance with the question output routine of FIG. 3, through speaker 7, to ask the user about his or her particular behavioral schedule today. The user's answer or response is processed in accordance with the routine of FIG. 5. Then, the destination input mode selection routine of FIG. 6 is executed, whereby the user may select a desired destination input mode from among those appearing on display 17 as shown in FIG. 7. When the categorical input mode is selected by the user, the display control routine of FIG. 8 is executed so that a pertinent group selection menu picture such as shown in FIGS. 10 and 11 now appears on display 17.

Figure 3:
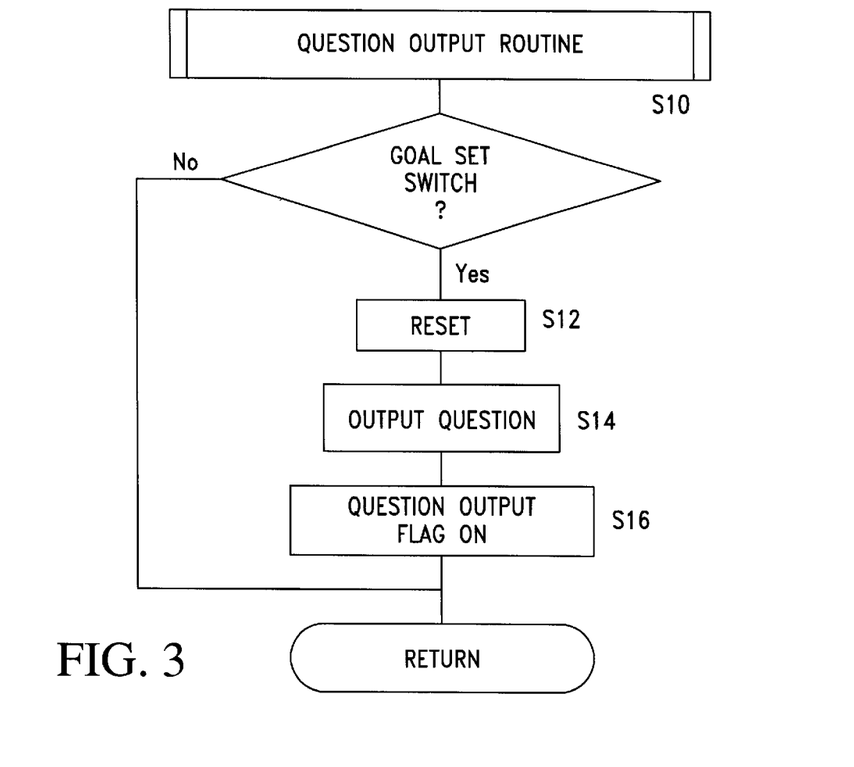
FIG. 3 is a flowchart of a question output routine that prompts the user to input the purpose of travel or behavioral schedule for today.
Figure 4:
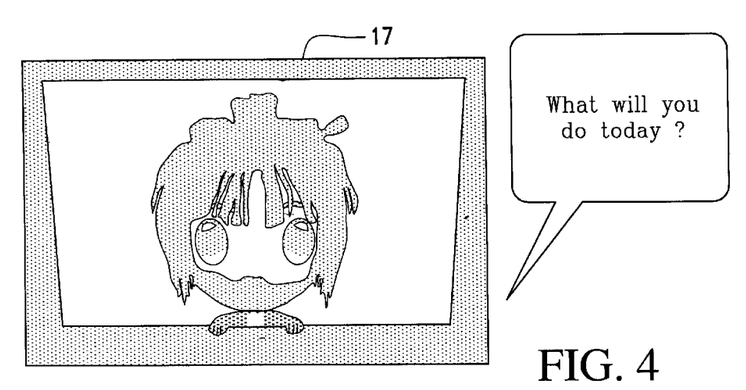
FIG. 4 is a view showing an example of a picture appearing on the display simultaneously with a voice output of a question about the user's behavioral schedule.

More particularly, when the user depresses switch 2b (FIG. 2), CPU 9 receives a switch-on signal ("Yes" at S10) and initializes and resets various flags including a question flag, a response flag, a categorical input mode flag, etc., at S12 of the question output routine of FIG. 3. Then, at S14, a question about the purpose of today's drive or today's schedule is output. Preferably, CPU 9 causes a personified agent to appear on display 17 and says "What will you do today ?", for example, through speaker 7, as shown in FIG. 4. After outputting the question, the question output flag becomes ON at S16.

Figure 5:
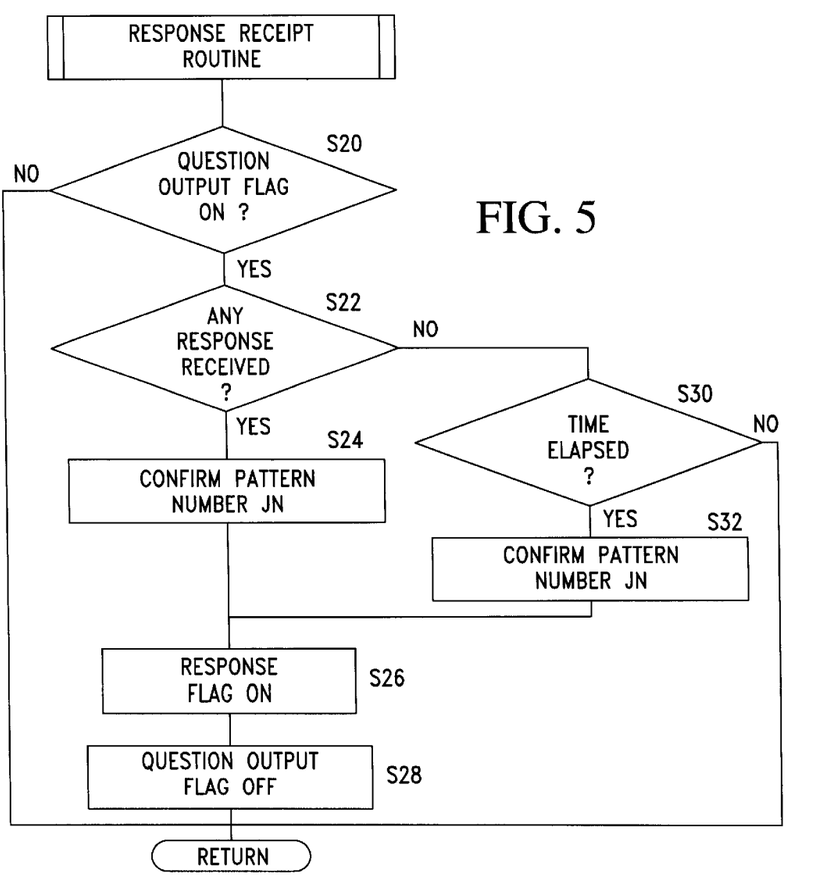
FIG. 5 is a flowchart of a user's response receipt routine which follows the question output routine of FIG. 3.
Figure 9:
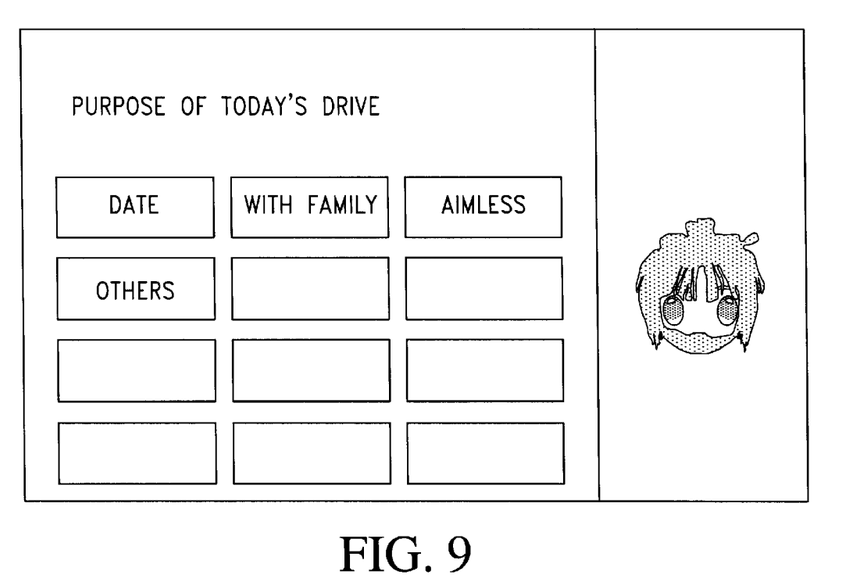
FIG. 9 is a view showing an example of a schedule selection menu picture appearing on the display, one of behavioral patterns shown being selected and input by the user.

The question output routine of FIG. 3 is followed by the response receipt routine of FIG. 5 that starts with S20 wherein it is confirmed whether the question output flag is ON at present. At S22, CPU 9 awaits any response from the user which is input through microphone 2 and analyzed by voice recognizing unit 3. A voice pattern dictionary in unit 3 stores several words that respectively indicate different types of user behavioral schedules, for example "DATE", "WITH FAMILY", "AIMLESS" and "OTHERS" as shown in FIG. 9. When unit 3 recognizes that the user's response input through microphone 2 coincides with one of the words stored in the dictionary, S22 produces a "Yes" result and a corresponding display pattern number JN is confirmed at S24. As shown in the table of FIG. 12, each behavioral schedule is assigned its peculiar pattern number. For example, when "DATE" is input as the user's behavioral schedule, its pattern number P1 is confirmed at S24. The user's behavioral schedule may be input through a finger touch on a selection menu screen on display 17, as shown in FIG. 9.

When no response is received, or the inputted response does not coincide any of the words stored in the dictionary of unit 3, within a predetermined period of time ("No" at S22 and "Yes" at S30), another display pattern number is confirmed at S32. The display pattern designated by this number includes a predetermined combination of destination groups which are arranged in a prescribed order depending upon the user's age and sex. This does not directly relate to the features of the present invention and therefore is not described in more detail.

After some display pattern number is confirmed at S24 or S32, the response flag becomes ON at S26 and the question flag 28 is turned OFF at S28.

The response receipt routine of FIG. 5 is followed by the routine of FIG. 6 for selecting a destination input mode. After confirming that the response flag is ON at S40, CPU 9 controls display 7 so that a menu picture for selection of a destination input mode such as shown in FIG. 7 appears thereon, at S42. The user may then select a desired one of the destination input modes. When the categorical input mode is selected by a finger touch with the section "CATEGORIES" on the touch panel of display 17 or by voice through microphone 2 ("Yes" at S44), the categorical input mode flag is turned ON at S46 and the response flag is turned OFF at S48. When another input mode is selected ("No" at S44), another input mode flag is turned ON at S50, which does not directly relate the features of the present invention and therefore will not be described in more detail. After some input mode flag is turned ON at S46 or S50, the response flag is turned OFF at S48.

The destination input mode selection routine of FIG. 6 is followed by the display control routine of FIG. 8. After it is confirmed at S60 that the categorical input mode flag is ON, which means that the user selected the categorical input mode by depressing "CATEGORIES" on display 17 of FIG. 7, CPU 9 again confirms at S62 the pattern number which has been confirmed at S24 (or S32) of the routine of FIG. 5, and controls display 17 at S64 such that the picture of FIG. 7 becomes one of the destination group selection menus, with reference to the table of FIG. 12. For example, when the user has input "DATE" as the user's behavioral schedule, its pattern number P1 is again confirmed at S62 and a corresponding destination group selection menu such as shown in FIG. 10 will now appear on display 17. In another example, when inputting "WITH FAMILY", its pattern number P2 is again confirmed at S62 and a corresponding destination group selection menu such as shown in FIG. 11 will now appear on display 17.

The user may next select and input a desired destination substantially in the same manner as in operation of the prior art system. For example, when the user's desired destination is an amusement park, the user depresses "AMUSEMENT PARKS" on the destination group selection menu of FIG. 10 so that another selection menu picture will now appear on display 17, which may be a list of administrative divisions in the country. The user may then select one of the administrative division in which the amusement park of interest is located, so that still another selection menu will now appear on display 17, which may be a list of names of amusement parks located in the selected administrative division, among which one may be selected and input by the user. Once the destination is input in this way, CPU 9 starts a route-finding operation for determining a recommended drive route from the current position to the input destination.

Although the present invention has been described in relation to a specific embodiment thereof, it should be understood by one skilled in the art that many modifications and variations may be made without departing from the scope and spirit of the invention as defined in the appended claims.

For example, the destination input mode selection routine of FIG. 6 may be executed before the question output routine of FIG. 3 and the response receipt routine of FIG. 5. In this modification, the user first designates a destination input mode from the menu picture of FIG. 7 and, when "CATEGORIES" is designated, the question about the user's behavioral schedule is output and the user's response is obtained. The response flag may be omitted, and S26 in FIG. 5, and S40 and S48 in FIG. 6 may not be provided.

It is not always necessary to produce a question about the user's behavioral schedule. In a modified embodiment, the routines of FIG. 3, FIG. 5 and FIG. 6 may be omitted, and the display control routine of FIG. 8 starts with the user's input of "CATEGORIES" on the menu of FIG. 7.

What we claim is:

1. A destination input device in a vehicle navigation system that determines a drive route from a current position to a destination input by a user, comprising:

question output means for outputting a question to a user regarding the user's purpose for a drive;

a first memory storing a plurality of destinations, each of said destinations being classified into one of a plurality of destination groups;

a second memory storing a plurality of purposes for a drive in relation to said destination groups;

first input means for inputting an answer to the question, which answer is correlated with plural destination groups in said second memory;

display control means for determining and displaying a first menu, as one of a plurality of possible menus, in accordance with the answer by the user to said question, said first menu including the destination groups correlated with the answer in said second memory, and for displaying a second menu of specific destinations classified in a destination group selected from said first menu; and second input means for selecting one of said destination groups from said first menu and for selecting a specified destination from said second menu.

2. A destination input device according to claim 1 wherein said question output means outputs said question responsive to operation of a destination input switch by the user.

3. A destination input device according to claim 1 wherein said second memory means has a table correlating each of said purposes for a drive with at least one of said destination groups.

4. A destination input device according to claim 1 wherein said second memory means has a table in which each of said purposes for a drive is stored in relation to a specific combination of said destination groups arranged in an order of priority of display by said display means.

5. A destination input device according to claim 4 wherein said table further contains a default combination of said destination groups which is used as the determined menu when the user produces no reply responsive to said question output by said question output means within a predetermined period of time.

6. A destination input device according to claim 5 wherein said destination groups of said default combination of said destination groups are assigned an order of priority which is determined in accordance with the user's age and/or sex.

7. A destination input device according to claim 1 wherein said input means comprises first input means for inputting a selection of one of said destination groups displayed by said display means, and second input means for inputting a selection of one of said destinations included in said destination group selected by said first input means.

8. A destination input method for a vehicle navigation system that determines a drive route from a current position to a destination input by a user, comprising the steps of:

providing a first memory storing a plurality of destinations, each of said destinations being classified into one of a plurality of destination groups;

providing a second memory in which purposes for a drive are each correlated with a specific combination of the destination groups arranged in an order of priority to be selected by the user;

displaying a first menu to output a question to the user regarding the user's purpose for a drive;

inputting a purpose for a drive in answer to the question;

displaying a second menu with a plurality of said destination groups with said order of priority correlated in the second memory with the input answer;

inputting a selection of one of the destination groups of the second menu;

displaying a third menu of a plurality of specific destinations classified in the selected destination group in the first memory; and selecting a specific destination from the third menu.

* * * * *